US006075356A

United States Patent [19]

Kovács

[11] Patent Number: 6,075,356

[45] Date of Patent: Jun. 13, 2000

[54] POWER SUPPLY CONTROL UNIT FOR A LAMP

[76] Inventor: Hermann Kovács, Hölgenäcker 6a, D-86949 Windach, Germany

[21] Appl. No.: 09/214,977

[22] PCT Filed: Jul. 17, 1997

[86] PCT No.: PCT/EP97/03840

§ 371 Date: Feb. 16, 1999

§ 102(e) Date: Feb. 16, 1999

[87] PCT Pub. No.: WO98/04104

PCT Pub. Date: Jan. 29, 1998

[30] Foreign Application Priority Data

Jul. 17, 1996 [DE] Germany ........................... 196 28 891

[51] Int. Cl.[7] .................................................... G05B 24/02

[52] U.S. Cl. ............................................ 323/327; 361/171

[58] Field of Search .................................... 323/237, 235, 323/238; 315/278, 307, 291; 361/171

[56] References Cited

U.S. PATENT DOCUMENTS 3,171,066 2/1965 Atkin et al. ............................ 361/171
4,573,098 2/1986 Williston ................................ 307/327
4,701,676 10/1987 Gibson ................................... 315/362

FOREIGN PATENT DOCUMENTS 38 06 486 A1 9/1989 Germany .......................... F21S 1/12
WO89/04110 5/1989 WIPO ............................ H05B 37/02

*Primary Examiner*—Adolf Deneke Berhane
*Assistant Examiner*—Rajnikant B. Patel
*Attorney, Agent, or Firm*—Duft, Graziano & Forest, P.C.

[57] ABSTRACT

A power supply control unit for a lamp having a luminous means and an at least partly electrically conductive lamp housing comprises a first and a second line via which a power supply signal can be applied to the luminous means and which are insulated from the lamp housing. The electrical power to be applied to the luminous means is switched or controlled by means of a switching device in the first or second line. A control circuit comprises an oscillator and an evaluation circuit, the oscillator issuing at an output thereof a signal which in terms of frequency differs from the power supply signal and is electrically coupled to the lamp housing. To control the switching device, the evaluation circuit responds to frequency and/or amplitude changes of the oscillator signal brought about by contacting of the lamp housing. The at least partly electrically conductive lamp housing furthermore has a device connected thereto which moreover is connected to a ground potential and constitutes a high impedance for the oscillator signal, whereas, relative to the high impedance, it constitutes a low impedance for the power supply signal.

16 Claims, 2 Drawing Sheets

POWER SUPPLY CONTROL UNIT FOR A LAMP

FIELD OF THE INVENTION

The present invention relates to a power supply control unit for a lamp, in particular for a lamp consisting of a luminous means and a lamp housing.

BACKGROUND OF THE INVENTION AND PRIOR ART

It is known to control the brightness of a lamp in a lamp unit connected to AC mains voltage by contacting an electrically conducting part of the lamp unit or lamp that serves as a sensor. Such a control is known, for example, from DE magazine "Funk-Technik", Vol. 37, No. 5, 1982, page 192.

In such a known circuit, the luminous means of a lamp is switched on by a first, brief touch on the electrically conducting part of the lamp serving as sensor. By prolonged touching of the sensor, the brightness of the luminous means can be altered, if required. Switching off of the luminous means is effected by another short touch on the sensor. This known circuit arrangement comprises a luminous means that is connected to AC mains voltage via a triac. A control unit having the sensor connected thereto issues a control signal to the triac. The control signal turns the triac on or off or controls the same in the conducting state in accordance with the desired brightness of the lamp. The brightness control of the lamp is effected in accordance with a phase angle control which is determined by the instantaneous value of the control signal.

In the control unit disclosed in the above-mentioned document, touching of a so-called touch area by a user causes a change in amplitude of the mains voltage stepped down by means of a high-impedance voltage divider. By sensing such an amplitude change, the lamp can both be switched on and off, or the brightness thereof can be controlled.

Moreover, there are circuit arrangements known in which the control unit contains an oscillator circuit that is powered by a direct voltage obtained from the mains voltage by a rectifying and conversion circuit. An output of the oscillator circuit is coupled to the electrically conducting part of the lamp serving as sensor. When a user touches the electrically conducting part of the lamp serving as sensor, the load of the oscillator contained in the oscillator circuit changes, thereby changing the frequency and/or the amplitude of the output signal of the oscillator. This change of the output signal is sensed by an evaluation circuit that is also contained in the control circuit. In accordance with such a change, the control signal for controlling the triac is produced.

Circuit arrangements of the type described hereinbefore, however, cannot be employed when the lamp to be operated has to fulfill the requirements of protection class 1 of the VDE guidelines. The requirements of protection class 1 prescribe that the phase conductor or the neutral conductor of an electric appliance must be insulated in simple manner from housing parts of the appliance. Furthermore, electrically conductive parts of the housing must be connected in electrically conducting manner to a protective or earth conductor at ground potential. Such systems for the power supply of electric appliances, using three conductors, namely a phase, a neutral conductor and a protective conductor, are frequently used. However, by using a protective conductor connected to electrically conductive parts e.g. of a lamp housing, it is not possible to use electrically conductive parts of the lamp housing as sensor, as described hereinbefore for a lamp the electrically conductive housing parts of which are not connected to a protective conductor.

The circuit arrangements of the type described hereinbefore thus can be used only for lamps fulfilling the requirements of protection class 2 of the VDE guidelines, which require no protective conductor. This presents a disadvantage to the effect that lamps fulfilling the requirements of protection class 2 involve much more expenditure in construction and manufacture as compared to lamps fulfilling the requirements of protection class 1. U.S. Pat. No. 4,701,676 already reveals a circuit arrangement for energizing and de-energizing and for dimming a lamp containing an oscillator circuit.

SUMMARY OF THE INVENTION

On the basis of the prior art indicated hereinbefore, the object of the present invention consists in providing a power supply control unit for a lamp in such a manner that electrically conductive parts of the lamp housing can be used as sensor for energizing, de-energizing or brightness control of the luminous means of the lamp even if the electrically conductive parts of the lamp housing are electrically coupled to a ground potential.

This object is met by a power supply control unit for a lamp having a luminous means and an at least partly electrically conductive lamp housing, comprising a first and a second line serving as phase and neutral conductor, via which a power supply signal can be applied to the luminous means and which are insulated from the lamp housing; a switching device in the first or second line for switching or controlling the electric power applied to the luminous means; a control circuit including an oscillator and an evaluation circuit, the oscillator issuing at an output thereof a signal which in terms of frequency is different from the power supply signal and is electrically coupled to the lamp housing, the evaluation circuit being responsive to frequency and/or amplitude changes of the oscillator signal caused by touching of the lamp housing, in order to control the switching device; and a device electrically connected to the lamp housing and a ground line, which constitutes a high impedance for the oscillator signal and, in relation to the high impedance, a low impedance for the power supply signal.

The present invention provides a power supply control unit for a lamp which has a luminous means and an at least partly electrically conductive lamp housing, in which the at least partly electrically conductive lamp housing is electrically coupled to a ground potential and in which the at least partly electrically conductive lamp housing furthermore can be used as sensor for energizing, de-energizing and brightness control of the luminous means, respectively.

With known circuit arrangements, it is not possible to use an at least partly electrically conductive lamp housing as sensor when the same is connected to a ground potential, as in case of usual lamps fulfilling the requirements of protection class 1 of the VDE guidelines. The present invention is based on the realization that, for example by provision of an amplitude- and/or frequency-selective device for signal parameters serving for power supply to the luminous means, an electric coupling between the conductive lamp housing parts and ground potential can be established while, furthermore, electric de-coupling between the output of the oscillator in the control circuit and ground potential can be achieved. This allows the use of the electricallly conductive lamp housing parts as sensor while protection in accordance with the requirements of protection class 1 of the VDE guidelines is maintained. The device referred to above as amplitude- and/or frequency-selective device may be an arbitrary device constituting a high impedance for the oscillator signal and (as compared to to the high impedance) for the oscillator a low impedance for the power supply signal. Such a device will be referred to in the following description as amplitude- and/or frequency-selective device, which may be, for example, an inductance coil or a diode or a triac.

The present invention thus renders possible that also in case of lamps fulfilling the requirements of protection class 1 of the VDE guidelines, electrically conductive parts of the lamp housing can be utilized as switches or dimmer switches for adjusting the brightness of the lamp. Embodiments of the present invention are set forth in the dependent claims.

BRIEF DESCRIPTION OF THE DRAWINGS

A preferred embodiment of the present invention will be described in more detail in the following with reference to the accompanying drawings in which.

DETAILED DESCRIPTION OF THE PREFERRED EMBODIMENT

In the preferred embodiment, the present invention is described in conjunction with a usual three-conductor current supply system comprising a phase P, a neutral conductor N and a protective or earth conductor S.

Figure 1:
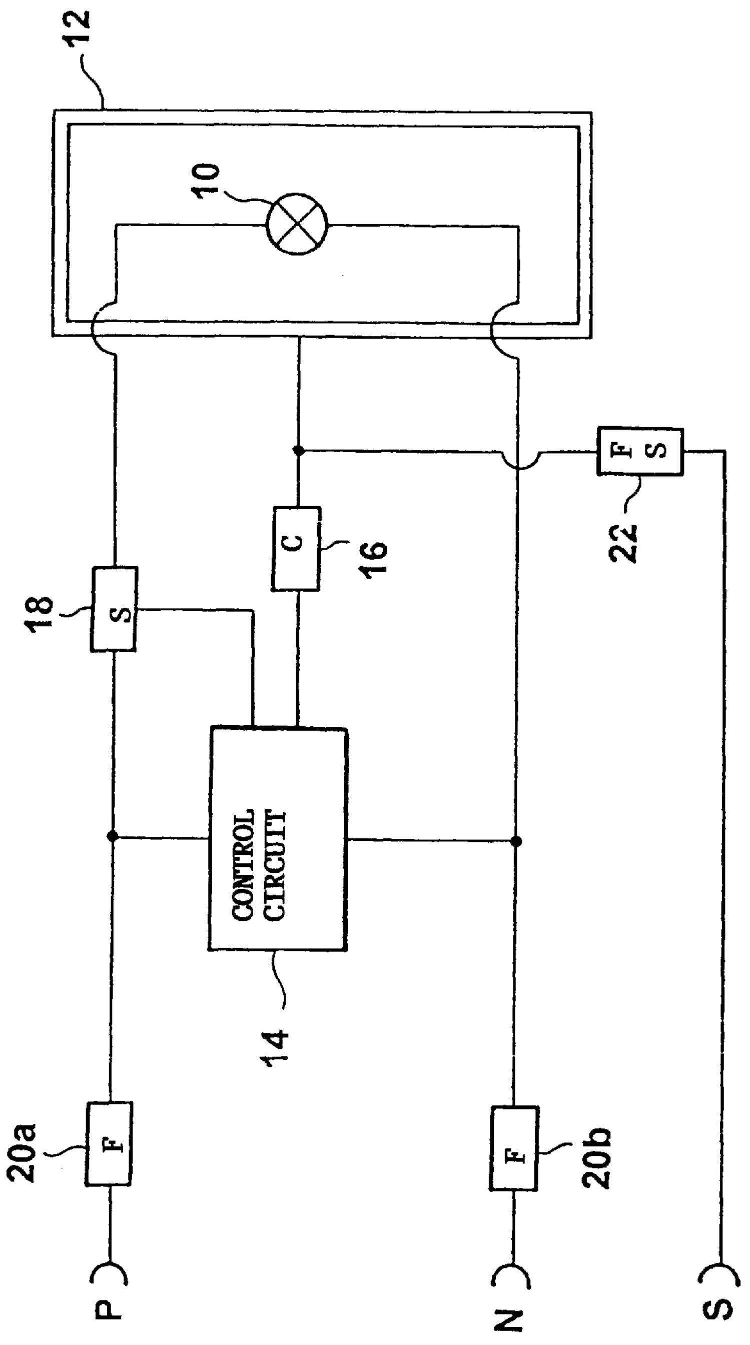
FIG. 1 shows a schematic view of a power supply control unit for a lamp according to the present invention.

FIG. 1 shows the three conductors P, N and S. Phase conductor P and neutral conductor N serve to supply power to a luminous means 10. The luminous means 10 is disposed in a lamp comprising a lamp housing 12 in addition. The term "lamp housing" as used herein shall not be limited to its original meaning "housing", but is to include also other parts that may be comprised by a lamp, e.g. lamp shades, carriers, mounting devices etc. The lamp housing is electrically insulated from lines P, N.

Connected between phase conductor P and neutral conductor N is a control circuit 14. The control circuit in the preferred embodiment comprises a rectifying and conversion circuit, and oscillator circuit and an evaluation circuit. The rectifying and conversion circuit serves for rectifying and converting the AC mains voltage, e.g. 230 Volt at 50 Hz, serving for feeding the luminous means 10, to a DC voltage of e.g. 12 V for feeding the oscillator circuit and the evaluation circuit.

Such rectifying and conversion circuits are well known in the art.

The oscillator circuit contained in control circuit 14 comprises an oscillator generating an oscillator signal with a frequency of e.g. 100 kHz. However, the magnitude of the frequency is not of critical importance, and other frequency values may be used as well. The output of the oscillator circuit delivering the oscillator signal in the preferred embodiment is connected via a coupling means 16 to the electrically conductive lamp housing 12 or an electrically conductive part of an at least partly electrically conductive lamp housing 12. Coupling means 16 comprises, for example, capacitors of low capacitance, e.g. 1 nF, for decoupling the control circuits in terms of DC current. The coupling means, furthermore, can comprise a filter means for filtering undesired frequency components.

Control circuit 14, which may be realized in the form of an integrated circuit, comprises furthermore the evaluation circuit. The evaluation circuit is electrically coupled to a switching device 18. Switching device 18 serves for switching or controlling the electrical power supplied to luminous means 10. The evaluation circuit controls switching device 18 in accordance with the output signal of the oscillator circuit, as will be elucidated in more detail hereinafter.

In the embodiment shown, fuses 20*a* and 20*b* are disposed in phase conductor P and neutral conductor N on the input side in front of control circuit 14.

According to the present invention, electrically connected to the at least partly electrically conductive lamp housing is a first terminal of an amplitude- and/or frequency-selective device 22. A second terminal of the amplitude- or frequency-selective device is connected to a ground potential, to which protective conductor S is connected in the present embodiment. The amplitude- and/or frequency-selective device thus is connected in the current path of protective conductor S in the embodiment shown in FIG. 1.

In the following, the operation of the power supply control unit according to the invention will be elucidated in more detail.

The oscillator circuit of control circuit 15 generates an oscillator signal the frequency of which is under the influence of the capacitive load present at the oscillator output. The capacitive load is constituted by the at least partly electrically conductive lamp housing and by coupling means 16 in the embodiment shown in FIG. 1. The signal output from the oscillator is decoupled from the ground potential, to which protective conductor S is connected, by the amplitude- and/or frequency-selective device 22 constituting a high impedance for the amplitude and/or the frequency of the oscillator signal. When a user contacts the electrically conductive lamp housing part serving as sensor, the capacitive load of the oscillator and thus the frequency of the oscillator signal generated by the oscillator change. The evaluation circuit in control circuit 15 is responsive to such a frequency change in order to control the switching device 18, i.e. for energizing or de-energizing the luminous means 10 or for changing the brightness thereof in dimmer-like manner. This method of controlling the switching device is known in the art.

In the following, the protective effect of the power supply control unit according to the invention will be elucidated in more detail, which permits the use of lamps meeting the requirements of protection class 1, in the form described hereinbefore. In the ordinary operating state, conductors P and N are electrically insulated from housing 12. It is, however, possible that in case of damage to the lamp an electrically conductive connection occurs between one of the conductors P or N and the electrically conductive lamp housing 12. In case of lamps meeting the requirements of protection class 1, the protective conductor is provided for this situation, which connects the at least partly electrically conductive lamp housing to a ground potential, so as to effect blowing of a fuse in order to prevent danger for a user of the lamp. This effect is ensured also with the power supply control unit according to the present invention. In case a short-circuit occurs between one of the conductors N and P and the lamp housing or also between the socket of luminous means 10 and housing 12, the amplitude- and/or frequency-selective device arranged in the protective conductor presents a negligible impedance to the power supply signal of e.g 230 V and 50 Hz present on the protective conductor due to the short-circuit. The electrically conductive lamp housing thus remains to be electrically connected to ground potential for such a signal. The protective effect therefore remains ensured for a user.

As amplitude- and/or frequency-selective device, it is possible to use for example an inductance coil having an inductance of 100 mH. Such an inductance coil has a low impedance of about 2 ohm for a signal as used for the power supply of luminous means 10. However, such an inductance coil represents a high impedance for the output signal of the oscillator and thus decouples the output signal of the oscillator from the ground potential.

As an alternative, it is possible to use as amplitude- and/or frequency-selective device a diode having e.g. a blocking voltage of 600 mV and a maximum current of 3 ampere, or a Z diode. Such a diode also is effective to ensure the electrical connection between the lamp housing and the ground potential for the power supply signals, while the output signal of the oscillator is decoupled from the ground potential. The polarity of the diode is not decisive for the protective effect obtained, with the safety in case of an defective connection between one of the conductors P and N and the lamp housing being also ensured when the diode erroneously is inserted in incorrect manner in the circuit.

The circuit according to the invention, when a diode is used as decoupling device, also is operative for oscillator voltages that are higher than the threshold or breakthrough voltage of the diode, for example in an order of magnitude of 2 V and higher. The reason therefor is that a series connection of the coupling capacitors of the coupling means 16 and the diode establishes a second artificial zero or neutral point, irrespective of the polarity of the diode, which is spaced from the earth conductor exactly by the threshold voltage of 600 to 700 mV. The amplitude of the oscillator oscillates around this artificial neutral point. In this respect, the polarity of the diode determines only whether the artifical neutral point has a more positive or more negative potential than the protective conductor. The artificial neutral point for the oscillator frequency, which is connected to the lamp housing, accordingly is formed on the cathode or the anode of the diode. In addition thereto, this point follows the mains hum present at the housing, however due to the polarity of the diode only in the form of a half wave.

The switching device 18 used may be a triac or a field effect transistor, for example. The switching device is electrically coupled to the evaluation circuit in an arbitrary, known manner in order to render possible control of the switching device.

In the embodiment shown in FIG. 1, the fuses 20*a* and 20*b* provided in conductors P and N serve as additional protective device. These fuses preferably have a melting integral $I^2t$ that is lower than the admissible $I^2t$ of the diode when a diode is used as amplitude- and/or frequency-selective device. Conventionally used dimmer switches as a rule have a fuse provided in the phase conductor only. However, the intended position of the phase conductor is not predictable in current supply systems used in many countries due to the plug-type connection involved. Depending on the terminal to which the phase is actually connected, an erroneous connection of one the connecting lines to the housing will result in blowing either of the smaller appliance fuse or of the house fuse having a breakthrough current between 10 and 16 ampere. In case only one fuse is used, the elements in the amplitude- and/or frequency-selective device would have to be designed for these high currents. However, when each branch, i.e. the phase conductor and the neutral conductor, is provided for example with a 2 ampere appliance fuse (230V·2 A=460 W lamp power), the amplitude- and/or frequency-selective device needs to be designed for 3 ampere only. Which branch actually constitutes the phase conductor, is then immaterial for the safety of the device.

It is possible to use for the amplitude- and/or frequency-selective device components which, with respect to the different signal nature of the power supply signals and the oscillator output signals, display a selective behavior, i.e. they display a low impedance for the power supply signals, wheras they represent a high impedance for the oscillator output signals. In the preferred embodiment, the amplitude- and/or frequency-selective device has to represent a low impedance for the supply voltage signal of 230 V and 50 Hz, whereas it represents a high impedance for the oscillator output signal having a low amplitude and, as compared with the frequency of the power supply signal, a high frequency.

Using the power supply control unit according to the invention, it is thus possible to use an at least partly electrically conductive lamp housing as sensor element for manually adjusting the brightness of a lamp, even when the lamp meets the requirements of protection class 1 of the VDE guidelines.

The power supply control unit according to the invention can be disposed both inside the lamp and outside the lamp, namely incorporated in the current supply cable of the lamp.

When the arrangement is disposed within in the lamp, it is merely necessary to provide a double insulation for the portion in which the arrangement is located. The remainder of the lamp may have a single insulation in accordance with protection class 1.

The power supply control unit according to the invention, for example, can be used together with a conventional touch control system in order to replace a conventional dimmer consisting, among other things, of a sliding controller or a rotary potentiometer in the connecting line of a lamp. Such a touch control system is described, for example, in WO 89/04110A1.

The evaluation circuit can be designed such that it is responsive to frequency changes in the output signal of the oscillator and/or that it is responsive to amplitude changes in the output signal of the oscillator effected by a change in the load connected to the oscillator.

As amplitude- and/or frequency-selective device 22 according to the present invention, it is also possible to use a triac which is fired in case of an insulation defect and thus constitutes for the power supply signal a low-impedance connection between the lamp housing and a ground line. In case of such an insulation defect, it is thus not possible that a dangerous voltage arises at the lamp housing. As an alternative, a thyristor may be employed instead of a triac.

Figure 2:
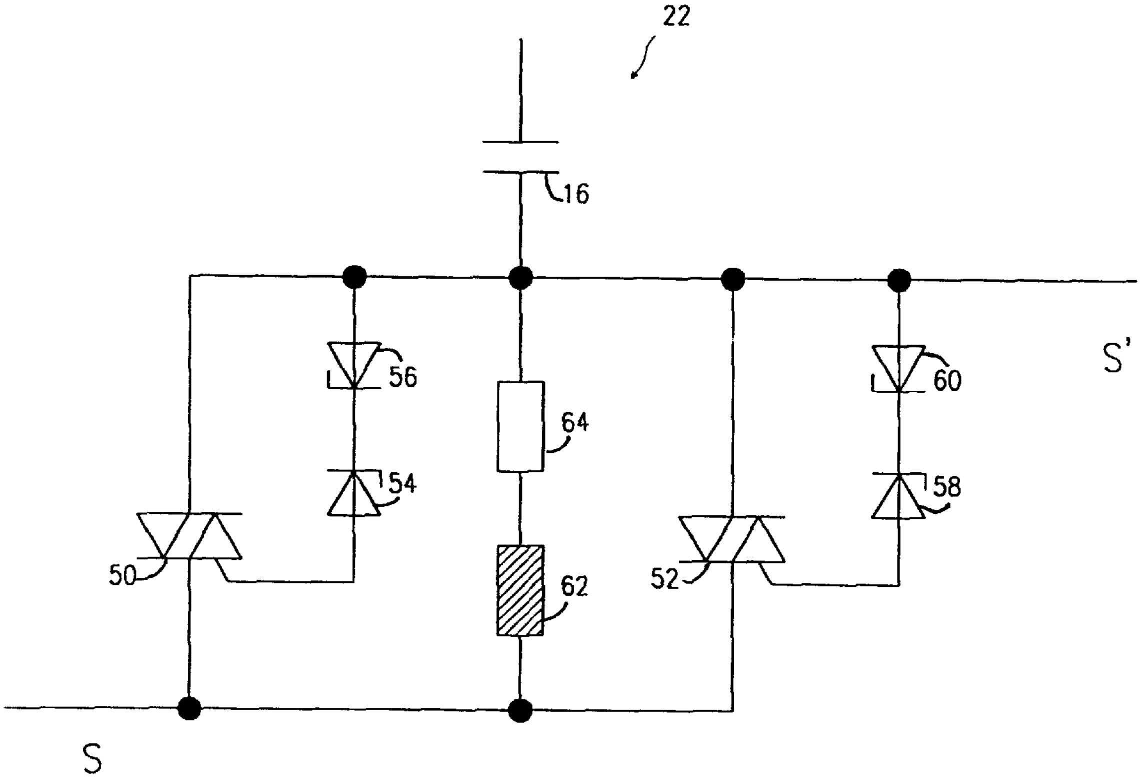
FIG. 2 shows an embodiment of an amplitude- and/or frequency-selective device according to the present invention.

FIG. 2 shows an embodiment of an amplitude- and/or frequency-selective device 22 comprising two triacs in redundant connection. Due to the redundant utilization of two triacs, a reliable protective function can be ensured also in case of failure of one triac. As depicted in FIG. 2, two triacs 50 and 52 are connected in parallel between the lamp housing 12 (FIG. 1) and ground potential to which protective conductor S (FIG. 1) is connected. The control line of the triacs is connected via two Zener diodes 54, 56 and 58, 60 each to the lamp-housing side terminal S' of the amplitude- and/or frequency-selective circuit. The Zener diodes may be e.g. 6.2V/500 mW Zener diodes.

The evaluation circuit is coupled to S' via a safety capacitor 16. The AC mains voltage and the oscillator frequency are coupled capacitively to S' via the safety capacitor. In doing so, the amplitude is not yet limited. This is effected by an inductance 62 which together with a series resistor 64 is connected in parallel to the two triacs between S and S'. With respect to the AC mains voltage, the inductance represents a low impedance, but for the oscillator frequency of the touch control system it represents a very high impedance in comparison therewith. Thus, a frequency-dependent voltage divider results. Series resistor 64 is necessary for setting the maximum division ratio and for resonance suppression of the resulting series oscillation circuit consisting of inductance 62 and capacitor 16. The amplitude of the coupled AC mains voltage on S' is reduced thereby e.g. to 4.5 V, whereas the amplitude of the coupled oscillator frequency remains unchanged.

The above configuration is necessary to render possible an evaluation of a frequency change of the oscillator, since during this evaluation the safety connection, consisting of triacs 50, 52 and Zener diodes 54, 56, 58 and 60, has to be of high impedance. This is ensured as long as the amplitude of the AC mains voltage and the oscillator frequency on S' remains below the breakthrough voltage of the Zener diodes. The evaluation circuit additionally uses a downstream high-pass filter for allowing passage of an altered oscillator frequency only.

In case of a defect, for example an insulation defect of the phase with respect to the lamp housing, the potential between S' and S rises beyond the breakthrough voltage of the safety connection and fires the triac. Since S' and S now are connected to each other with low impedance, a high current flow occurs which in turn causes one of the two fine fuses at the mains input of the power supply control unit to blow. Also in case of a defect, the low flow voltage of the triac in case of high currents ensures that no dangerous voltages with respect to S, i.e. ground, occur at the lamp housing. An additional advantage of this circuit consists in that the inductive component need not fulfill specific requirements, like those to be met by a protective conductor inductance, and thus can be chosen with small dimensions without the safety of the user being impaired.

The high current flowing in case of a low-impedance insulation defect thus causes the fine fuses 20*a* and 20*b* in lines P and N to trigger. It is advantageous to ensure in terms of construction that the $I^2t$ necessary for triggering the fuses is at the most half as high as the admissible, specified $I^2t$ of the triac used.

In case of a high-impedance insulation defect, the voltage arising at the lamp housing is limited to a value of e.g. 7.8 V. In this case too, the energy is dissipated via the triac, it just does not reach the value necessary for the holding current. The triac thus is not quenched only upon termination of the mains half wave or upon triggering of one of the two fine fuses, but immediately after elimination of the defect.

What is claimed is:

1. A power supply control unit for a lamp having a luminous means and an at least partly electrically conductive lamp housing, comprising the following features:

a first and a second line serving as phase and neutral conductor, via which a power supply signal can be applied to the luminous means and which are insulated from the lamp housing;

a switching device in the first or second line for switching or controlling the electric power applied to the luminous means;

a control circuit including an oscillator and an evaluation circuit, the oscillator issuing at an output thereof a signal which in terms of frequency is different from the power supply signal and is electrically coupled to the lamp housing, the evaluation circuit being responsive to frequency and/or amplitude changes of the oscillator signal caused by touching of the lamp housing, in order to control the switching device; and a device electrically connected to the lamp housing and a ground line, which constitutes a high impedance for the oscillator signal and, in relation to the high impedance, a low impedance for the power supply signal.

2. The power supply control unit of claim 1, wherein the device constituting a high impedance for the oscillator signal and, in relation to the high impedance, a low impedance for the power supply signal, is an amplitude- and/or frequency-selective component.

3. The power supply control unit of claim 2, wherein the amplitude- and/or frequency-selective component is an inductance coil.

4. The power supply control unit of claim 2, wherein the amplitude- and/or frequency selective component is a series connection of a resistor and an inductance coil.

5. The power supply control unit of claim 1, wherein the device constituting a high impedance for the oscillator signal and, in relation to the high impedance, a low impedance for the power supply signal, is a diode or a Z diode.

6. The power supply control unit of claim 1, wherein the device constituting a high impedance for the oscillator signal and, in relation to the high impedance, a low impedance for the power supply signal, comprises a triac.

7. The power supply control unit of claim 6, wherein the device constituting a high impedance for the oscillator signal and, in relation to the high impedance, a low impedance for the power supply signal, is constituted by a circuit comprising two triacs in redundant connection.

8. The power supply control unit of claim 1, wherein the device constituting a high impedance for the oscillator signal and, in relation to the high impedance, a low impedance for the power supply signal, comprises a thyristor.

9. The power supply control unit of claim 8, wherein the device constituting a high impedance for the oscillator signal and, in relation to the high impedance, a low impedance for the power supply signal, is constituted by a circuit comprising two thyristors in redundant connection.

10. The power supply control unit of claim 1, wherein fuse devices are provided on the input side in the first and second lines serving as phase and neutral conductors.

11. The power supply control unit of claim 1, wherein the switching device is a triac.

12. The power supply control unit of claim 1, wherein the switching device is a field effect transistor.

13. The power supply control unit of claim 1, wherein the switching device is an IGBT (insulated gate bipolar transistor).

14. The power supply control unit of claim 1, wherein the switching device is a GTO (gate turn-off switch).

15. The power supply control unit of claim 1, wherein the output signal of the oscillator is electrically coupled to the lamp housing via a coupling means (16).

16. The power supply control unit of claim 15, wherein the coupling means comprises capacitors of low capacitance.

* * * * *